United States Patent [19]

Kato

[11] Patent Number: 4,651,293

[45] Date of Patent: Mar. 17, 1987

[54] IMAGE PROCESSING SYSTEM COMPRISING DITHER SCREEN SIZE SELECTION BASED ON IMAGE PERIODICITY

[75] Inventor: Tomokazu Kato, Tokyo, Japan

[73] Assignee: Ricoh Company, Ltd., Tokyo, Japan

[21] Appl. No.: 562,130

[22] Filed: Dec. 16, 1983

[30] Foreign Application Priority Data

Dec. 17, 1982 [JP] Japan ............................. 57-222756

[51] Int. Cl.[4] .......................... G06J 1/00; H04N 1/40
[52] U.S. Cl. .................................. 364/602; 364/604; 364/715; 364/807; 364/819; 358/280; 358/283; 382/42
[58] Field of Search .............. 364/600, 602, 604, 715, 364/728, 742, 807, 819–820; 358/11–12, 21 R, 30, 35–38, 280, 283, 284, 298, 293–294; 382/50, 41–42, 52–53

[56] References Cited

U.S. PATENT DOCUMENTS

| | | | |
|---|---|---|---|
| 4,258,393 | 3/1981 | Ejiri et al. .......................... | 358/283 |
| 4,288,821 | 9/1981 | Lavallee et al. ................. | 358/280 X |
| 4,475,127 | 10/1984 | Iinuma .......................... | 358/283 X |
| 4,485,408 | 11/1984 | Kamizyo et al. .................. | 358/283 |
| 4,495,522 | 1/1985 | Matsunawa et al. ................ | 358/280 |
| 4,496,987 | 1/1985 | Yuasa et al. .......................... | 358/283 |
| 4,517,605 | 5/1985 | Yokomizo .......................... | 358/280 |
| 4,517,606 | 5/1985 | Yokomizo et al. ................. | 358/280 |

Primary Examiner—Gary V. Harkcom
Attorney, Agent, or Firm—David G. Alexander

[57] ABSTRACT

An image processing system which processes an input image such as a halftone image or an image having a high periodicity into a two-level image by use of dither matrixes. Peaks of an auto-correlation of the image are calculated and, then, a mean period of the calculated peaks. An adequate dither matrix is selected in response to the calculated mean period.

7 Claims, 7 Drawing Figures

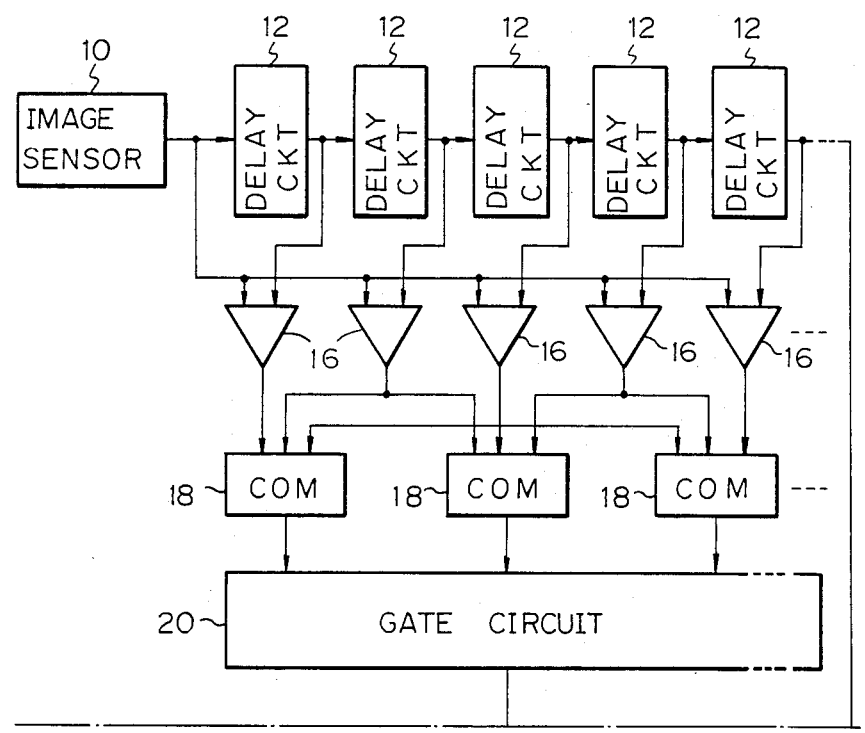

| 1 | 3 |
|---|---|
| 4 | 2 |

(b)

| 1 | 5 | 3 |
|---|---|---|
| 7 | 9 | 8 |
| 4 | 6 | 2 |

(c)

| 1  | 9  | 3  | 11 |
|----|----|----|----|
| 13 | 5  | 15 | 7  |
| 4  | 12 | 2  | 10 |
| 16 | 8  | 14 | 6  |

(d)

| 1  | 9  | 3  | 17 | 15 |
|----|----|----|----|----|
| 19 | 7  | 13 | 11 | 6  |
| 18 | 12 | 2  | 10 | 22 |
| 20 | 4  | 16 | 24 | 14 |
| 23 | 25 | 8  | 21 | 5  |

| 2 | 4 | 6 |
|---|---|---|
| 3 | 8 | 1 |
| 7 | 0 | 5 |

(b)

| 2 | 4 | 6 |
|---|---|---|
| 7 | 0 | 5 |
| 3 | 8 | 1 |

| 0  | 15 | 1  | 14 |
|----|----|----|----|
| 13 | 2  | 12 | 3  |
| 6  | 9  | 7  | 8  |
| 11 | 4  | 10 | 5  |

(b)

| 0  | 15 | 2  | 13 |
|----|----|----|----|
| 14 | 1  | 12 | 3  |
| 5  | 10 | 7  | 8  |
| 11 | 4  | 9  | 6  |

(c)

| 0  | 15 | 4  | 11 |
|----|----|----|----|
| 14 | 1  | 10 | 5  |
| 3  | 12 | 7  | 8  |
| 13 | 2  | 9  | 6  |

| 10 | 23 | 6 | 19 | 2 |
|---|---|---|---|---|
| 3 | 11 | 24 | 7 | 15 |
| 16 | 4 | 12 | 20 | 8 |
| 9 | 17 | 0 | 13 | 21 |
| 22 | 5 | 18 | 1 | 14 |

(b)

| 0 | 17 | 6 | 24 | 13 |
|---|---|---|---|---|
| 12 | 1 | 19 | 8 | 20 |
| 21 | 14 | 3 | 15 | 7 |
| 9 | 23 | 10 | 2 | 16 |
| 18 | 5 | 22 | 11 | 4 |

(c)

| 14 | 23 | 7 | 16 | 0 |
|---|---|---|---|---|
| 2 | 11 | 20 | 9 | 18 |
| 15 | 4 | 13 | 22 | 6 |
| 8 | 17 | 1 | 10 | 24 |
| 21 | 5 | 19 | 3 | 12 |

(d)

| 11 | 20 | 9 | 18 | 2 |
|---|---|---|---|---|
| 0 | 14 | 23 | 7 | 16 |
| 19 | 3 | 12 | 21 | 5 |
| 8 | 17 | 1 | 10 | 24 |
| 22 | 6 | 15 | 4 | 13 |

…

IMAGE PROCESSING SYSTEM COMPRISING DITHER SCREEN SIZE SELECTION BASED ON IMAGE PERIODICITY

BACKGROUND OF THE INVENTION

The present invention relates to a system for processing an image which is read on a pixel-by-pixel basis and, more particularly, to an image processing system which transforms a halftone image into a two-level image using dither matrixes.

Dither processing is a method extensively used for processing a halftone image into a two-level image. A problem heretofore encountered with the dither method is that strong moiré tends to develop in the resulting image. Moiré develops, for example, when a grid pattern, dot photograph or like picture having periodicity is processed. One approach to eliminating moiré is varying the threshold matrix in a pseudorandom manner, as disclosed in Japanese Patent Publication No. 55-24634/1980. However, just as it alleviates the moiré situation, it brings about another problem that the image quality is lowered when a picture with no peridicity is processed.

SUMMARY OF THE INVENTION

It is therefore an object of the present invention to provide an image processing system which achieves a quality two-level image which is free from moiré.

It is another object of the present invention to provide an image processing system which is capable of producing a moiré-free two-level image even when an input image shows strong periodicity, by selecting an adequate dither matrix.

It is another object of the present invention to provide an image processing system which accurately detects a mean period of an input image.

It is another object of the present invention to provide a generally improved image processing system.

An image processing system of the present invention processes an input image into two levels with respect to a threshold value which is an element corresponding to a dither matrix. The system comprises a mean period calculator for calculating a mean period of the input image from a pixel signal train of the input image, a dither matrix supply circuit for generating a plurality of dither matrixes, and a dither matrix selector for selecting one of the dither matrixes in response to the calculated mean period.

In accordance with the present invention, an image processing system is disclosed which processes an input image such as a halftone image or an image having a high periodicity into a two-level image by use of dither matrixes. Peaks of an autocorrelation of the image are calculated and, then, a mean period of the calculated peaks. An adequate dither matrix is selected in response to the calculated mean period.

The above and other objects, features and advantages of the present invention will become apparent from the following detailed description taken with the accompanying drawings.

BRIEF DESCRIPTION OF THE DRAWINGS

FIG. 3 is a diagram illustrating how FIGS. 3A and 3B are combined to constitute a block diagram of an image processing system embodying the present invention;

FIGS. 4(a) to 4(b) are views of exemplary dither matrixes having different sizes; and FIGS. 5(a) and 5(b), 6(a) to 6(c) and 7(a) to 7(d) are views of other examples of dither matrixes.

DESCRIPTION OF THE PREFERRED EMBODIMENT

While the image processing system of the present invention is susceptible of numerous physical embodiments, depending upon the environment and requirements of use, a substantial number of the herein shown and described embodiments have been made, tested and used, and all have performed in an eminently satisfactory manner.

It has been generally accepted that moiré in a dither-processed image results from interactions between a frequency component in the image and an image sampling pitch. However, I have found that the moiré due to sampling is generally very weak compared to actually occurring ones, and that the major cause of the appearance of moiré is the interactions between a certain frequency component $f_0$ of an input image and a frequency $f_D$ of a dither matrix used for dither processing. Experiments showed that no moiré develops in a dither-processed image if the frequency $f_0$ and the dither matrix frequency $f_D$ are prevented from approaching each other.

A characteristic feature of the present invention, which is based on the above finding, is that a mean period of an input image is detected out of an image signal train representative of the input image, and a specific dither matrix is selected in accordance with the detected mean period.

Another characteristic feature of the present invention resides in the process for determining a mean period of an input image. While Fourier transformation is usually employed for detecting a frequency component in an image, it is apt to stress local property of an image. For example, Fourier transformation tends to pick up sampling noise unless the window function for cutting off a signal is slowly varied in peripheral portions. In light of this, the present invention proposes a process for obtaining a mean period as described hereinafter.

Assuming that an image signal level of an input image (density or luminance level of a pixel) is $g(x_i)$, an autocorrelation A(t) is produced by:

$$A(t) = \frac{1}{N-t} \sum_{i=1}^{N-t} g(x_i) g(x_i + t) \qquad (1)$$

where $x_i$ is the coordinates of the "i" pixel and N, the number of pixels to be sampled.

Figure 1:
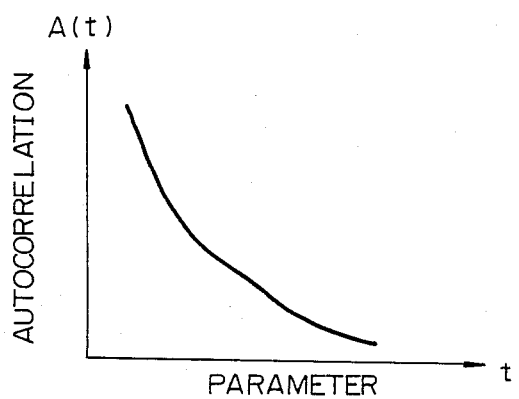
FIG. 1 is a graph showing an autocorrelation in a non-periodic picture.
Figure 2:
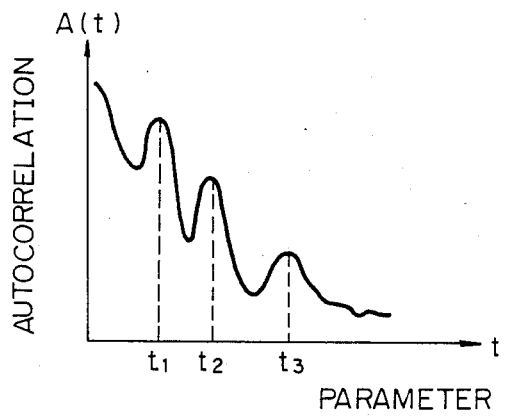
FIG. 2 is a graph showing an autocorrelation in a periodic picture.

The autocorrelation A(t) follows a curve such as shown in FIG. 1 when the image has no periodicity, while following a curve with peaks and valleys such as shown in FIG. 2 when the image has strong periodicity. In FIG. 2, the distance between adjacent values of the parameter t which develops the peaks represents a period of the input image and the intensity of each peak, an intensity of the periodicity. A mean period of an input image is attainable by averaging such periods of peaks of the autocorrelation A(t).

Assuming $$\left.\begin{array}{l}A(i+1) > A(i)\\A(i+1) > A(i+2)\end{array}\right\} \quad (2)$$

the value $t_j$ of t which develops a peak (corresponding to $t_1$, $t_2$ or $t_3$ in FIG. 2) is expressed as:

$$t_j = \frac{i \cdot A(i) + (i+1) \cdot A(i+1) + (i+2) \cdot A(i+2)}{A(i) + A(i+1) + A(i+2)} \quad (3)$$

where i is the discrete expression of t shown in FIG. 2 and j, serial numbers 1, 2, 3, . . . assigned to i's which satisfy the relations (2), from the smallest one to the largest.

Therefore, a mean period T of an input image is expressed as:

$$T = \frac{\sum_{j=1}^{n} t_j}{\sum_{j=1}^{m} j} \quad (4)$$

where n is the number of peaks used for the calculation of the mean period and for which "2" or "3" usually suffices.

Next, to eliminate moiré due to dither-processing, the present invention selects a specific dither matrix which satisfies the following relation:

$$|T - M| > T_0 \quad (5)$$

where M is the size of a dither matrix and $T_0$, a threshold value. The relation implies that a dither matrix is selected such that the difference between the mean period T of the input image and the size (period) M of the dither matrix remains larger than the threshold value $T_0$, thereby preventing moiré from developing in the processed image.

Figure 3B:
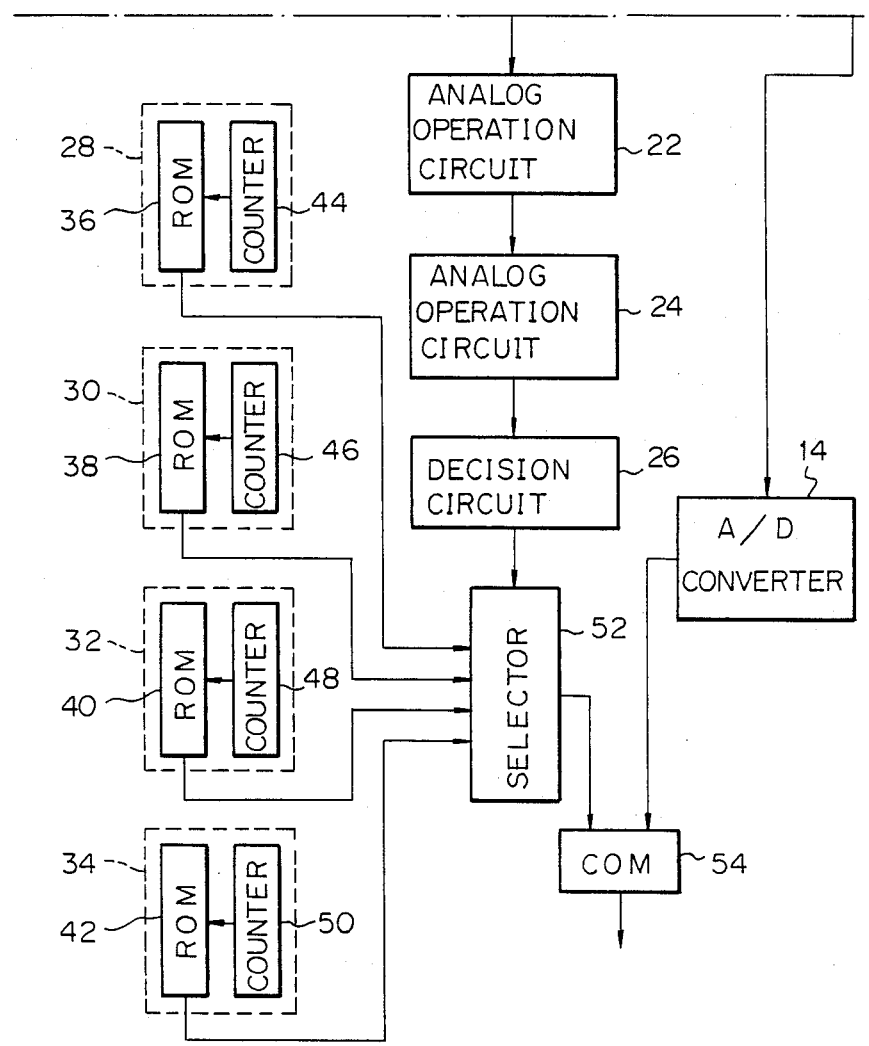

Referring to FIG. 3, an image processing system embodying the present invention is shown and includes an image sensor 10. The image sensor 10 functions to read an input image as a matrix of pixels and generate an analog pixel signal indicative of a density (or luminance) of each pixel. The pixel signal is sequentially delayed by a series of analog delay circuits 12 each effecting a delay of one pixel time. The delayed pixel signal is fed from the last delay circuit 12 to an analog-to-digital converter (ADC) 14.

The image processor also includes five analog integrators 16 each comprising a combination of an amplifier and a capacitor. The integrators 16 are adapted to provide autocorrelations A(t) according to the equation (1), that is, autocorrelations A(t) of t=1, t=2, t=3, . . . from the leftmost one to the rightmost one in the drawing. Analog comparators 18 serve to check the autocorrelations provided by the integrators 16 with respect to the previously mentioned relations (2). Only when the relations (2) are satisfied, the comparators 18 enable a gate circuit 20 to deliver the autocorrelations A(i), A(i+1) and A(i+2) to an analog operation unit 22 therethrough. The operation unit 22, based on the equation (3), calculates $t_j$ and feeds it to a second analog operation unit 24. The operation unit 24 performs the equation (4) to obtain a mean period T, which is then routed to a decision circuit 26.

The image processor further includes dither circuits 28, 30, 32 and 34 each of which is made up of respectively a read only memory (ROM) 36, 38, 40 or 42 and a counter 44, 46, 48 or 50. The counters are adapted to control the addresses of their associated ROMs. The ROM 36 stores a dither matrix (a) with a size M=2 shown in FIG. 4, the ROM 38 a dither matrix (b) with a size M=3 shown in FIG. 4, the ROM 40 a dither matrix (c) with a size M=4, and the ROM 42 a dither matrix (d) with a size M=5. In response to a pixel at coordinates (I, J) of an input image, each of the counters 44, 46, 48 and 50 reads out of their associated ROM 36, 38, 40 or 42 an element at coordinates (K, L) in the dither matrix as a threshold value.

Here, the coordinates (I, J) and (K, L) are correlated as follows:

$$K = \text{Mod}(i, J) \quad (6)$$

$$L = \text{Mod}(J, M) \quad (7)$$

In the equation (6), K=M when K=0 and, in the equation (7), L=M when L=0.

All the dither circuits 28, 30, 32 and 34 operate all the time and supply their outputs to a selector 52. The decision circuit 26 checks the mean period T supplied thereto from the operation unit 24 with respect to the relation (5), selects one of the dither circuits 28, 30, 32 and 34 which satisfies the condition (5), and controls the selector 52 to select such specific dither circuit. The output of the dither circuit (digital signal) selected by the selector 52 is routed from the selector 52 to one input terminal of a digital comparator 54. Supplied to the other input terminal of the digital comparator 54 is a multi-level digitized pixel signal which is output from the ADC 14. The pixel signal is processed by the comparator 54 to have two levels with respect to the threshold value which is output from the selector 54.

The present invention is not limited to the arrangement of four dither circuits 28, 30, 32 and 34 to which dither matrixes having different sizes M are assigned. For example, use may be made of a single ROM storing the dither matrix (d) with M=5 shown in FIG. 4, in which case one of the counters 44, 46, 48 and 50 will be selected in response to a mean period T to apply its output to the ROM and an output of the ROM to the comparator 54. That is, the counters 44, 46, 48 and 50 may be switched from one to another to selectively use the dither matrix with M=5 as "2×2", "3×3" and "4×4" fragmentary matrixes and a "5×5" total matrix. Other examples of dither matrixes are illustrated in FIGS. 5–7.

In another possible construction in accordance with the present invention, an intensity of the periodicity of an input image may be detected to select a dither matrix only when the intensity increases beyond a certain limit, on the basis of the relation (5). An intensity of periodicity may be produced as follows.

In the valleys of the autocorrelation A(t), there hold the relations:

$$\left.\begin{array}{l}A(i+1) < A(i)\\A(i+1) < A(i+2)\end{array}\right\} \quad (8)$$

When the relations (8) holds, a period $t_k$ of the valleys is determined as follows:

$$t_k = \frac{i \cdot A(i) + (i+1) \cdot A(i+1) + (i+2) \cdot A(i+2)}{A(i) + A(i+1) + A(i+2)} \quad (9)$$

where k indicates serial numbers assigned to the valleys from one whose i is the smallest.

An intensity I of periodicity is expressed as:

$$I = \frac{\sum_{j=1}^{n} A(t_j)}{\sum_{k=1}^{m} A(t_k)} \quad (10)$$

where m is the number of valleys for which "2" or "3" usually suffices.

Based on the condition (5), any one of the dither matrixes is selected when the following relation holds with respect to the intensity I of periodicity:

$$I > I_0 \quad (11)$$

where $I_0$ is a threshold value.

In summary, it will be seen that the present invention provides an image processing system which dither-processes an image without entrailing any moiré by selecting an appropriate dither matrix, even if the input image has substantial periodicity. The quality of images processed in accordance with the present invention is superior to that attainable by randomizing a threshold value. Additionally, the image processor determines a mean value of an input image utilizing the peak periods of an autocorrelation and, therefore, it is prevented from erroneously detecting a mean period due to sampling noise, thereby surely selecting an appropriate dither matrix.

Various modifications will become possible for those skilled in the art after receiving the teachings of the present disclosure without departing from the scope thereof.

What is claimed is:

1. An image processing system for processing an input image comprising a pixel signal train into two levels with respect to threshold values which are elements of a dither matrix, said image processing system comprising:

means period calculator means for calculating a mean period of the input image from the pixel signal train of the input image;

dither matrix supply means for generating a plurality of dither matrixes; and dither matrix selector means for selecting one of said dither matrixes in response to the calculated mean period;

the dither matrix selector means comprising decision means for determining whether a condition $|T-M| > T_0$ is satisfied (where T is a mean period of the input image, M a size of any of the dither matrixes, and $T_0$ a predetermined threshold value), and means for selecting any of the dither matrixes which satisfies said condition.

2. An image processing system as claimed in claim 1, in which the mean period calculator means comprises autocorrelation calculator means for calculating an autocorrelation of the pixel signal train, peak detector means for detecting a plurality of peak values of the calculated autocorrelation, and peak mean period calculator means for calculating a mean value of periods of the detected peaks.

3. An image processing system as claimed in claim 1, in which the dither matrix supply means comprises a plurality of read only memories each of which stores a dither matrix of a size different from the others, and a plurality of counters for respectively controlling addresses of said read only memories.

4. An image processing system as claimed in claim 1, in which the dither matrix supply means comprises a single read only memory for storing a single dither matrix having a large size, and a plurality of counters for switching the dither matrix stored in the single read only memory in such a manner as to form dither matrixes of different sizes.

5. An image processing system as claimed in claim 1, further comprising an analog-to-digital converter for coverting the input image into a digital pixel signal, and a comparator for comparing the digital pixel signal and the selected dither matrix with respect to corresponding elements thereof.

6. An image processing system as claimed in claim 1, in which the input image is a halftone image.

7. An image processing system as claimed in claim 1, in which the input image is an image having high periodicity.

* * * * *